United States Patent
Lee

(10) Patent No.: US 7,730,292 B2
(45) Date of Patent: Jun. 1, 2010

(54) PARALLEL SUBWORD INSTRUCTIONS FOR DIRECTING RESULTS TO SELECTED SUBWORD LOCATIONS OF DATA PROCESSOR RESULT REGISTER

(75) Inventor: Ruby B. Lee, Princeton, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 619 days.

(21) Appl. No.: 10/403,977

(22) Filed: Mar. 31, 2003
(Under 37 CFR 1.47)

(65) Prior Publication Data

US 2005/0177706 A1   Aug. 11, 2005

(51) Int. Cl.
*G06F 7/00* (2006.01)
*G06F 15/00* (2006.01)
(52) U.S. Cl. .................................... 712/300
(58) Field of Classification Search ............. 712/212, 712/213, 300
See application file for complete search history.

(56) References Cited

U.S. PATENT DOCUMENTS

| | | | |
|---|---|---|---|
| 3,404,378 A * | 10/1968 | Threadgold et al. ......... | 712/245 |
| 4,438,493 A * | 3/1984 | Cushing et al. ............. | 711/218 |
| 5,033,044 A * | 7/1991 | Williams et al. ........... | 370/510 |
| 5,301,285 A * | 4/1994 | Hanawa et al. ............. | 712/212 |
| 5,329,630 A * | 7/1994 | Baldwin ..................... | 711/173 |
| 5,526,140 A * | 6/1996 | Rozzi ......................... | 358/535 |
| 5,666,300 A * | 9/1997 | Adelman et al. ........... | 708/521 |
| 5,809,330 A * | 9/1998 | Ninomiya ................... | 710/9 |
| 5,812,809 A * | 9/1998 | Matsuo et al. .............. | 712/212 |
| 6,009,505 A * | 12/1999 | Thayer et al. ............... | 712/6 |
| 6,687,724 B1 * | 2/2004 | Mogi et al. .................. | 708/490 |
| 6,922,472 B2 | 7/2005 | Lee et al. | |
| 6,952,478 B2 | 10/2005 | Lee et al. | |
| 2002/0031220 A1 | 3/2002 | Lee et al. | |
| 2002/0078011 A1 | 6/2002 | Lee et al. | |
| 2002/0108030 A1 | 8/2002 | Lee et al. | |
| 2005/0149590 A1 | 7/2005 | Lee et al. | |

OTHER PUBLICATIONS

McGregor et al.; Architectural Enhancements for Fast Subword Permutations with Repetitions in Cryptographic Applications; 2001; IEEE.*
Lee, Ruby B., "Accelerating Multimedia with Enhanced Microprocessors" IEEE, Micro, 1995, pp. 22-32.

* cited by examiner

*Primary Examiner*—Eddie P Chan
*Assistant Examiner*—Corey Faherty

(57) ABSTRACT

In the context of a microprocessor and a program, the invention provides parallel subword compare instructions that store results in a selectable intra-register subword location. In a targeting approach, an instruction permits the location to be specified; alternatively, there can be plural instructions, each associated with one of the locations. In a replicating approach, plural replicas are stored in the alternative locations. In a shifting approach, the instruction moves prior results, so that the number of subsequent iterations of the instruction determines the location of a result. The invention provides for overwriting and content-preserving instructions, and for overlapping and separate locations. The invention allows results from multiple parallel subword compare operations with relatively few instructions. The invention also provides for other parallel subword instructions.

19 Claims, 5 Drawing Sheets

| 05 | 09 | 0A | 10 | 23 | BF | C1 | A3 | RA0
| E2 | B2 | AE | 12 | 32 | BF | C1 | A3 | RB0    PCompTOS0
| XX | XX | XX | XX | XX | XX | XX | 07 | RC0

| 13 | 42 | CC | 56 | 59 | E1 | 22 | 34 | RA1
| 21 | 64 | DD | 56 | E1 | E1 | 22 | 34 | RB1    PCompTOS1
| XX | XX | XX | XX | XX | XX | 17 | XX | RC1

| 34 | E1 | 56 | 32 | 31 | F2 | 4E | 2F | RA7
| 44 | E1 | 56 | 32 | E3 | F2 | 4E | 2F | RB7    PCompTOS7
| 77 | XX | XX | XX | XX | XX | XX | XX | RC7

| 77 | 67 | 57 | 47 | 37 | 27 | 17 | 07 | RD0    OR x 7

Fig. 2

| 05 | 09 | 0A | 10 | 23 | BF | C1 | A3 | RA0
| E2 | B2 | AE | 12 | 32 | BF | C1 | A3 | RB0
| XX | XX | XX | XX | XX | XX | XX | 07 | RD0

PCompSPS

| 13 | 42 | CC | 56 | 59 | E1 | 22 | 34 | RA1
| 21 | 64 | DD | 56 | E1 | E1 | 22 | 34 | RB1
| XX | XX | XX | XX | XX | XX | 07 | 17 | RD0

PCompSPS

| 34 | E1 | 56 | 32 | 31 | F2 | 4E | 2F | RA7
| 44 | E1 | 56 | 32 | E3 | F2 | 4E | 2F | RB7
| 07 | 17 | 27 | 37 | 47 | 57 | 67 | 77 | RD0

PCompSPS

Fig. 3

| 07 | 07 | 07 | 07 | 07 | 07 | 07 | 07 | RC0

| 17 | 17 | 17 | 17 | 17 | 17 | 17 | 17 | RC1

| 17 | 07 | 17 | 07 | 17 | 07 | 17 | 07 | RD0

| 27 | 27 | 27 | 27 | 27 | 27 | 27 | 27 | RC2

| 37 | 37 | 37 | 37 | 37 | 37 | 37 | 37 | RC3

| 37 | 27 | 37 | 27 | 37 | 27 | 37 | 27 | RD1

| 37 | 27 | 17 | 07 | 37 | 27 | 17 | 07 | RE0

| 47 | 47 | 47 | 47 | 47 | 47 | 47 | 47 | RC4

| 57 | 57 | 57 | 57 | 57 | 57 | 57 | 57 | RC5

| 57 | 47 | 57 | 47 | 57 | 47 | 57 | 47 | RD2

| 67 | 67 | 67 | 67 | 67 | 67 | 67 | 67 | RC6

| 77 | 77 | 77 | 77 | 77 | 77 | 77 | 77 | RC7

| 77 | 67 | 77 | 67 | 77 | 67 | 77 | 67 | RD3

| 77 | 67 | 57 | 47 | 77 | 67 | 57 | 47 | RE2

| 77 | 67 | 57 | 47 | 37 | 27 | 17 | 07 | RF0

Fig. 4

| 05 | 09 | 0A | 10 | 23 | BF | C1 | C3 | RA0
| E2 | B2 | AE | 12 | 32 | BF | C1 | A3 | RB1    PCompROS
| 07 | 07 | 07 | 07 | 07 | 07 | 07 | 07 | RC0

Fig. 5

| 07 | 00 | 07 | 00 | 07 | 00 | 07 | 00 | RC1

Fig. 6

| 07 | 07 | 07 | 07 | 07 | 07 | 07 | 07 | RV1
| 07 | 07 | 07 | 07 | 07 | 07 | 07 | RV2
| 07 | 77 | 77 | 77 | 77 | 77 | 77 | 77 | RC2

Fig. 7

PARALLEL SUBWORD INSTRUCTIONS FOR DIRECTING RESULTS TO SELECTED SUBWORD LOCATIONS OF DATA PROCESSOR RESULT REGISTER

BACKGROUND OF THE INVENTION

The present invention relates to data processing and, more particularly, to instructions executable by data processors. A major objective of the present invention is to provide parallel subword compare instructions that improve processor performance in certain situations common in multimedia applications.

Much of modern progress is associated with advances in computer technology. Typical computers include one or more processors that perform operations on data in accordance with a program of instructions. Associated with each microprocessor is an instruction set, i.e., a set of instructions that the microprocessor can execute. The performance of a processor in the context of a particular application is largely dependent on how efficiently the tasks demanded by the application can be characterized using the processor's instruction set.

As computers have become more powerful, they have been confronted with ever more demanding applications, such as real-time video manipulation. Video is typically presented as a synchronous stream of images. Each image can be described as a two-dimensional array of picture elements (pixels). Each pixel is typically described by one multi-bit (e.g., 8-bit) color value per color dimension. Many applications, e.g., video compression, group the pixels into blocks (e.g., 8×8-pixel blocks).

Common binary image operations (such as comparisons between blocks of the same or different images) can require 2×64×8 (two blocks, 64 pixels per block, 8-bits per pixel) bits of operand data to be handled concurrently. Using the increasingly prevalent 64-bit processors, a binary image block comparison can be implemented using eight pairs of 64-bit registers for the operands, with additional registers being used for storing intermediate and final results.

In all, sixty-four comparisons are called for. Each comparison results in one bit of information. In total, the sixty-four comparisons can result in a single 64-bit word that can be stored in a single result register. How efficiently these sixty-four comparisons can be made is dependent on the instruction set associated with the microprocessor. When a word compare instruction is used, operands with eight data bits and filled out with fixed values must be generated. Then words are compared. Then a one-bit value is stored in the result register at a suitable bit position. Successive results must be stored in appropriate positions in the result register without erasing prior results. Thus, sixty-four compare instructions and many other instructions are required to complete an image block compare using word compare instructions.

Some processors provide for a parallel subword compare instruction. As applied to a pair of 64-bit registers, eight pairs of 8-bit subwords stored in the registers can be compared in parallel to generate an 8-bit result that can be, for example, stored in the eight least-significant bit positions of a result register. This result can be shifted to more-significant bit positions to make room for the results of parallel subword compare operations on other pairs of registers. To complete an image block compare, eight parallel subword instructions, seven shift instructions and seven OR instructions (to combine results) are required, for a total of twenty-two instructions.

The total number of instructions is dependent on the particular implementation of the parallel subword compare instruction. For example, an alternative parallel subword compare instruction, used in the Intel Itanium processor, can store eight replicas of each subword compare result in the corresponding subword location of the result register. In this case, many more ancillary instructions are required to arrange the results of the eight parallel subword compare instructions in a single result. Accordingly, the total number of instructions required for an image block compare might be more than double that given for the first example.

In either case, the number of instructions required for implementing an image block compare is larger than desired. If the instructions are performed serially, the time consumed is excessive. If the instructions are performed in parallel, the ability of the processor to perform other operations in parallel with the image block compare operation is limited.

Of course, if a 16-register parallel subword compare instruction were available, the image block compare could be performed in one instruction. However, such an instruction would be complex to implement from a hardware standpoint and perhaps overly specialized from a software standpoint. What is needed is a parallel subword compare instruction that permits more efficient image block compares, as well as related operations.

SUMMARY OF THE INVENTION

The present invention provides a parallel subword (e.g., compare) instruction (or a set of such instructions) that allows selection of a result-register subword location for its result. This novel instruction obviates the need for the dedicated "shift" instructions to permit the results of plural prior-art parallel subword instructions to be combined. Thus programming is simplified and performance is enhanced. The present invention also provides programs that utilize the novel instructions and data processors that execute the novel instructions.

"Targeting", "replicating", and "shifting" approaches are provided for intra-register location selection. In the targeting approach, the instruction identifies (directly or indirectly) the intra-register location at which its result is to be stored. A single instruction can include a field for specifying the result location. Alternatively, there can be separate instructions for each location. In the replicating approach, an instruction stores replicas of the result in all locations so, of necessity, a replica is stored at the selected location. In the shifting approach, the instruction shifts the result-register contents before storing its result. The result can then be moved as necessary to the selected location by iterating the shifting parallel subword instruction. Iterating the parallel subword instruction rather than using a shift instruction permits subsequent results to be combined with prior results as they are shifted.

"Overwriting" and "content-preserving" approaches are provided for handling register locations not required for storing instruction results. In the overwriting approach, the instruction overwrites all of the selectable locations (e.g., with all zeroes). In the "content-preserving" approach, the unselected locations retain information present in the register before the instruction was executed. "Shifting" instructions are inherently content preserving, while the "replicating" instructions are generally "overwriting". Both the overwriting and the content-preserving approaches can be implemented in the context of targeting parallel subword instructions. The content-preserving approach mitigates the need for separate combining instructions and thus can enhance performance; on the other hand, content-preserving approach requires additional hardware that is not normally implemented in microprocessors. The overwriting approach requires only the standard two-port read capability.

"Overlapping" and "separate" intra-register locations are provided for all the foregoing approaches. Normally, separate (non-overlapping) intra-register locations are desired so that successive iterations of a parallel subword instruction do not overwrite (where instructions write to the same register) or mask (where instructions write to different registers for subsequent bit-wise combination) prior results. If locations are overlapping, results are readily overwritten or masked— which can be useful in encryption schemes. Overwritten information can be supplied separately for recombination by subscribers having access to an appropriate encryption key. Such encryption schemes can make it commercially feasible to distribute video content over public channels (e.g., the Internet).

The present invention substantially reduces the number of instructions required to combine the results of multiple parallel subword operations. The invention further provides design flexibility in trading-off the size of this reduction with hardware complexity. Generally, the invention simplifies programming and enhances throughput, especially in the context of multimedia applications. In this latter context, the invention also provides a ready mechanism for encryption. Other advantages and features in addition to or in lieu of the foregoing are apparent from the description below with reference to the following drawings.

BRIEF DESCRIPTION OF THE DRAWINGS

FIG. 2 is a schematic illustration of a program involving executing targeting, overwriting, separate, parallel subword compare instructions in accordance with the present invention.

FIG. 3 is a schematic illustration of a program involving executing shifting, content-preserving, separate, parallel subword compare instructions in accordance with the present invention.

FIG. 4 is a schematic illustration of a program involving mixing the results of replicating, overwriting, separate, parallel subword compare instructions in accordance with the present invention.

FIG. 5 is a schematic illustration of a program involving executing a replicating, overwriting, separate, parallel subword compare instruction in which the result replica pitch equals the result replica length in accordance with the present invention.

FIG. 6 is a schematic illustration of a program involving executing a replicating, overwriting, separate, parallel subword compare instruction in which the result replica pitch exceeds the result replica length in accordance with the present invention.

FIG. 7 is a schematic illustration of a program involving executing a replicating, overwriting, separate, parallel subword compare instruction in which the result replica pitch is less than the result replica length in accordance with the present invention.

DESCRIPTION OF THE PREFERRED EMBODIMENTS

Figure 1:
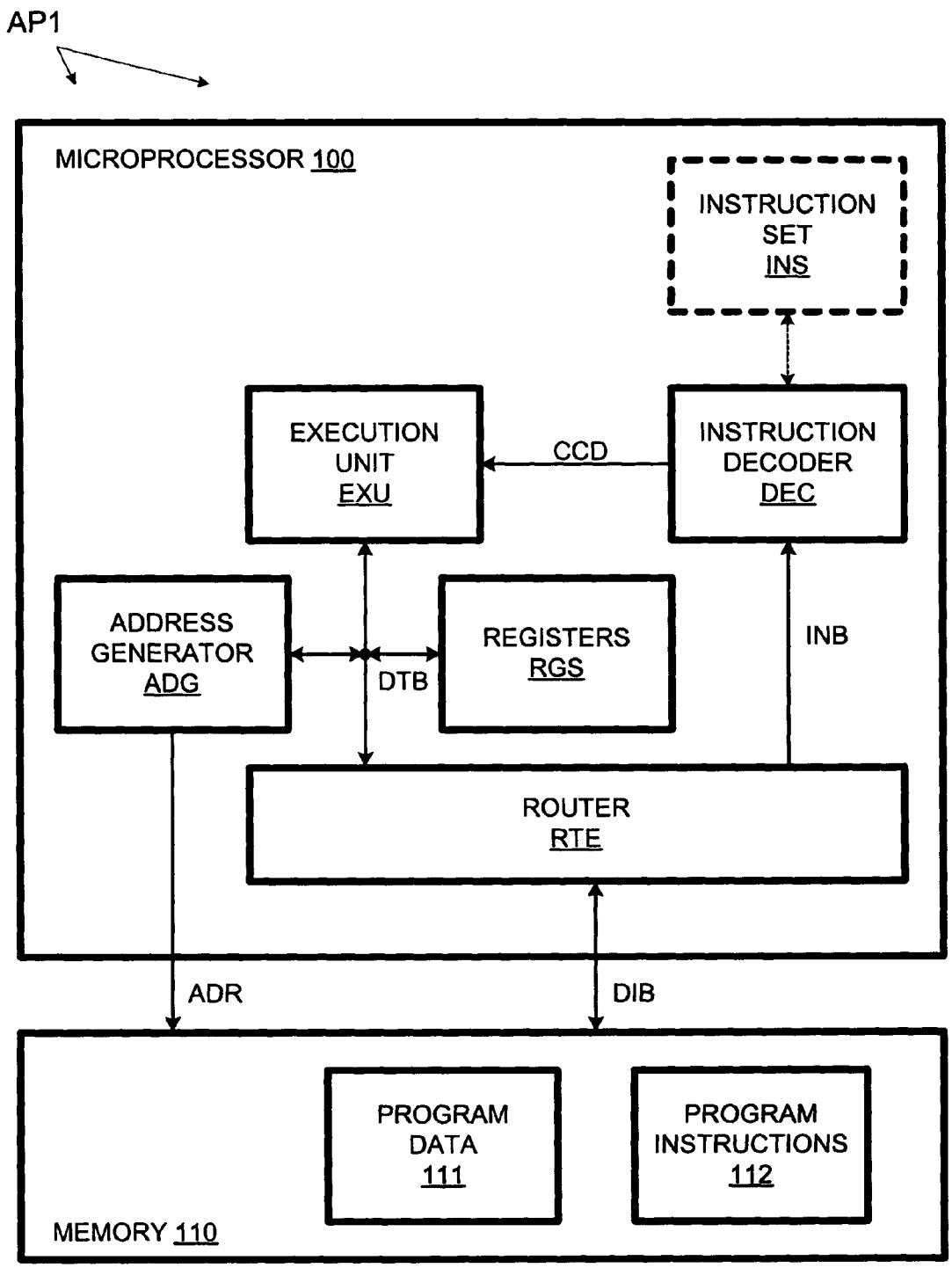
FIG. 1 is a schematic illustration of a computer system including a microprocessor having an instruction set in accordance with the present invention.

A computer system AP1 includes a microprocessor 100 and a memory 110, as shown in FIG. 1. The contents of memory 110 include program data 111 and instructions constituting a program 112. Microprocessor 110 includes an execution unit EXU, an instruction decoder DEC, registers RGS, an address generator ADG, and a router RTE.

Generally, execution unit EXU performs operations on data 111 in accordance with program 112. To this end, execution unit EXU can command (using control lines ancillary to internal data bus DTB) address generator ADG to generate the address of the next instruction or data required along address bus ADR. Memory 110 responds by supplying the contents stored at the requested address along data and instruction bus DIB.

As determined by indicators received from execution unit EXU along indicator lines ancillary to internal data bus DTB, router RTE routes instructions to instruction decoder DEC via instruction bus INB and data along internal data bus DTB. The decoded instructions are provided to execution unit EXU via control lines CCD. Data is typically transferred in and out of registers RGS according to the instructions.

Associated with microprocessor 100 is an instruction set of instructions INS that can be decoded by instruction decoder DEC and executed by execution unit EXU. Program 112 is an ordered set of instructions selected from instruction set INS. For expository purposes, microprocessor 100, its instruction set and program 112 provide examples of all the instructions described below. Typical microprocessors, instruction sets, and programs of the invention implement only a subset of the described instructions.

Targeting, overwriting, separate instructions PCompTOS0, PCompTOS1, PCompTOS2, PCompTOS3, PCompTOS4, PCompTOS5, PCompTOS6, and PCompTOS7 can be parsed as follows: "Perform a parallel subword compare (using 8-bit subwords) and store the result in the nth (n=0-7) 8-bit subword (byte) position of a result register." For the present comparison operation, a "1" is to be stored when the corresponding subword contents are equal; otherwise a "0" is to be stored. However, other subword compare instructions can assign "1" and "0" outcomes based on other relations, e.g., such as "greater than or equal to".

Program 112 calls for eight parallel-subword compare operations for a total of sixty-four byte-wide compare operations. A first of the parallel subword compare operations is an instance of PCompTOS0 that specifies that a parallel subword compare operation is to be performed on the contents of operand registers RA0 and RB0 and the result of the compare operation is to be stored in the least-significant 8-bit word position of result register RC0. (All registers are in bank of registers RGS). The beginning and end points of this parallel subword compare operation are indicated in the three registers represented at the top of FIG. 2. Each register is shown with values represented in hexadecimal format. The three least-significant bytes (8-bit subwords) of the operand registers are equal, while the other bytes are not. Accordingly, the result of the comparison is 00000111 in binary or 07 in hexadecimal. This result is stored in the least-significant subword position of register RC0. The remainder of the subword positions is filled with "non-data" zeroes, represented as XX hexadecimal.

Instruction PCompTOS1 calls for a second parallel subword compare operation to be performed on the contents of registers RA1 and RB1, with the result to be stored in the second-least-significant subword position of result register RC1. Comparison of the contents of registers RA1 and RB1 shows that the comparison results in 00010111 binary or 17 hexadecimal. Thus, 17 is stored in the second least significant subword position of result register RC1.

Likewise, PCompTOS2 is applied to the contents of registers RA2 and RB2 and the result 27 hexadecimal is stored in the third-least-significant subword position of result register RC2. Similarly, result 37 is stored in the fourth-least-significant bit position of RC3, 47 in the fifth-least-significant bit position of RC4, 57 in the sixth-least-significant bit position of RC5, 67 is the seventh-least-significant bit position of RC6, and (as shown explicitly) 77 is stored in the eighth-least-significant (i.e., the most-significant) subword position of result register RC7.

The contents of result registers RC0, RC1, ..., RC7 can be ORed (or added) to yield a final result of the parallel-subword comparisons as shown stored in register RD0. Assuming that the adding or ORing is performed two registers at a time, seven corresponding instructions are required in addition to the eight parallel compare operations. The total number of instructions beginning with the operands to be compared and ending with the final single-register result is fifteen.

Since the location of the result can be specified, the shift instructions required in the background art to combine results across pairs of registers are not required. In the case of a comparison of 8×8 pixel blocks, this saves seven shift operations. Accordingly, the total number of instructions required to effect an 8×8-image block compare is reduced from 22 to 15, roughly a ⅓ reduction.

A targeting, content-preserving, separate variant is implemented using instructions PCompTPS0-PCompTPS7; these instructions leave result bit positions unchanged unless they are determined by the result (whereas the previous set of instructions set undetermined result bits to zero). Thus, the subword positions marked "XX" in FIG. 2 would be left unchanged rather than forced to zeroes. In this case, all result registers can be written directly to final result register RD0. However, additional hardware, e.g., provisions for a three-port read, are required to enable this content-preserving variant. Accordingly, at a cost of additional hardware and execution complexity, the one-register parallel subword compare procedure consumes only eight instructions (as opposed to fifteen in the 2-register variant and twenty-three in the prior art).

In the targeting variants of parallel subword compare instruction, a result location must be specified, either implicitly or explicitly. It can be specified implicitly by using different instructions for each subword location. It can be specified explicitly by a value entered in a field reserved in the instruction for that purpose. Alternatively, the instruction can point explicitly or implicitly to a location in which a value indicating the location is stored. For example, an instruction can point to a register in which a value is stored indicating the subword location at which the result is to be stored. Another alternative is to tie the subword location to the register in which the result is to be stored. For example, if the result is to be stored in register RC0 then the result is stored in the least-significant subword position, but if the result is to be stored in register RC1, then the result is to be stored in the second-least-significant subword position.

A shifting, content-preserving, separate variant is implemented using a PCompSPS instruction that shifts the result register contents one-subword (in this case a byte) to the left before storing the result of a comparison. Thus, when instances of the instruction are used consecutively, the previous results are moved "out of the way" rather than overwritten. As shown in FIG. 3, the result (07) of the PCompSPS comparison of operands stored in registers RA0 and RB0 is initially stored at the least-significant byte of result register RD0. The next PCompSPS comparison of the operands stored in register RA1 and RB1 stores its result (17) also at the least-significant byte of register RD0. However, prior to storing the result, the contents of the register are shifted one byte to the left so the previous result (07) is preserved, as shown in FIG. 3. As shown in FIG. 3, the eight iterations of PCompSPS yield the desired eight-comparison result in register RD0. As with the content-preserving variant of the targeting approach, additional hardware, e.g., provisions for a three-port read, are required to attain the advantage of shifting, content-preserving, separate variant.

A replicating, overwriting, separate variant is implemented using a PCompROS instruction that causes multiple replicas of a result to be stored. Using the data of FIG. 2, the results of the PCompROS instruction are shown in FIG. 4 at registers RC0-RC7. The operation of a single PCompROS instruction is shown in FIG. 5. Note that each of these registers stores eight replicas of the respective result that was stored singly in FIGS. 2 and 3.

The results are combined using mix instructions. MIX8 instructions are used on the result registers, yielding the results in registers RD0-RD3. MIX16 instructions are applied to pairs of these registers to yield the results shown in registers RE0 and RE1. Finally, a MIX32 instruction is applied to yield the result shown in register RF0 which is the same as the result stored in RD0 in FIG. 4. In the case of the PCompROS instruction, eight such instructions, plus four MIX8 instructions, two MIX16 instructions, and 1 MIX32 instruction were required for a total of 15 instructions. This is the same number of instructions required using the PCompTOSN instructions, and seven less than using the instructions that result in a single replica stored in a fixed subword location.

While it is contemplated that the two consecutive comparison (or other characterizing) instructions be of the same type, the invention does not require this. For example, a shifting-type instruction can follow a non-shifting instruction. Also, a replicating instruction can precede or succeed a non-replicating instruction. Furthermore, the operations called for by the two instructions need not be the same; for example, one could be a binary compare and the other an "equals zero" instruction.

Thus, the present invention provides for different types of instructions that can reduce substantially the number of instructions required for parallel-subword compare instructions. While the illustrated embodiment provides for both specification of a result location and for multiple replicas of a result, the present invention also provides for instruction sets including one of the types to the exclusion of the other.

In the illustrated embodiments, the registers are 64 bits and the subwords are 8 bits, so that there are 8 mutually exclusive subword locations per register. Due to this choice of register and subword sizes, the results are one subword long. If longer subwords are used, e.g., 16 bits, there are only 4 16-bit subwords per 64-bit register, and thus 4 bits per result. Thus, there can be 16 mutually exclusive 4-bit result locations in a register. The instruction set can be designed to permit any of these to be selected for a parallel subword compare operation. Thus, one format for such an instruction can be PComp (first operand register, second operand register, result register, subword size, target location in result register for result).

It is also possible for a targeting, shifting, or replicating instruction to specify certain variables implicitly or explicitly, such as subword size, pitch, and offset. For example, the subword size can be specified. In addition, the result spacing can be specified. By default, the spacing is such that the locations are contiguous with respect to each other, as illustrated in FIG. 5. However, the replicas can be represented on a larger pitch so that the replicas are separated by one or more bits as shown in FIG. 6 in which the pitch is twice the replica length.

By choosing the pitch to be an integer multiple (preferably a power of two) of the subword size, and varying the offset by different numbers of subword units, multiple subword compare operations can be represented in a single register without using mix instructions. For example, setting the pitch to 16 bits and varying the offset from 0 to 8 bits, allows two results to be written to the same register, provided undetermined bits are left unchanged. This obviates the need for the Mix8 instructions in combining results. Accordingly, the total number of instructions required for the parallel-register parallel subword compare procedure is 11 instead of 15.

If the pitch is set to 32 bits and the offset varied in subword units, the Mix8 and the Mix16 instructions are not required; in that case, 8 parallel compare and 1 Mix32 instruction are required for a total of 9. Finally, if the pitch equals the register length (64 bits), the situation corresponds to the PCompTPSN instructions described above; in this case, only the 8 parallel subword compare instructions are required to achieve the desired result.

Alternatively, the location pitch can be less than the number of bits required to represent the result. In FIG. 7, the pitch is half the result replica length. Accordingly, there is more than one bit to be stored in some bit positions. Since this is not possible, some sort of resolution must be built in. One of the values can be given precedence or some binary function of the values can be used to determine what is stored at a bit position. In FIG. 7, the conflicting bits are XORed to yield the stored result. For encryption applications, compare results can be combined by XORing rather than ORing. Less information is lost. Also, the results or an XOR operation are more likely to appear as white noise—which is typical a goal for an encryption scheme. The overwritten information can be re-supplied, with a user decryption key required to properly reassemble the data.

The present invention applies not only to compare operations, but to other operations, including unary, binary, and higher-order operations. Register lengths can vary and need not be a power of two. Subword lengths can vary and need not be a power of two. The number of result replicas can be one, two, a fixed number, or whatever number is required to fill the register. If the register is not commensurate with the replica length, the least-significant bit of the register need not hold the least significant bit of a result. Bits of the result register not determined by the operation result can be left unchanged or set to either zero or one. These and other modifications to and variations upon the illustrated embodiments are provided for by the present invention, the scope of which is limited only by the following claims.

The invention claimed is:

1. A computer comprising:
   plural word-length registers including a result register having plural subword locations;
   an instruction decoder for decoding computer-executable program instructions, said program instructions being program-instruction instances of instruction-set instructions of an instruction set; and
   an execution unit for executing said program instructions;
   said instruction set including a subset of one or more parallel-subword instruction-subset instructions all program-instruction instances of which yield the same subword-length operation result given the same word-length operands, said subset being characterized in that for each of said plural subword locations there exists a series of program-instruction instances of said instruction-subset instructions for which a last program-instruction instance of said series writes a subword-length operation result into that subword location, a first program-instruction instance of said series writing said subword-length operation result into said result register.

2. A computer as recited in claim 1 wherein said subset includes plural instruction-subset instructions respectively corresponding to said plural subword locations, each program-instruction instance of said instruction-subset instructions causing the result of the associated operation to be stored at the corresponding selectable location.

3. A computer as recited in claim 2 wherein each of said plural instruction-subset instructions overwrites bit positions within non-selected locations of said result register and within the selected location.

4. A computer as recited in claim 2 wherein each of said plural instruction-subset instructions leaves intact contents of bit positions within non-selected locations of said result register but not bit positions within the selected location.

5. A computer as recited in claim 1 wherein said subset includes a characterizing instruction-set instruction program-instruction instances of which generate plural replicas of said result to be stored in respective ones of said selectable locations.

6. A computer as recited in claim 1 wherein said subset includes an instruction-subset instruction that causes said result to be stored in a subword location of said result register that depends on the number of times said instruction is consecutively iterated.

7. A computer as recited in claim 1 wherein at least one pair of said plural subword locations overlap.

8. A computer as recited in claim 1 wherein said plural subword locations are mutually exclusive.

9. Computer-readable memory comprising:
   a program of computer-executable program instructions, said program instructions being program-instruction instances of instruction-set instructions including a subset of parallel-subword instruction-set instruction all program-instruction instances of which yield the same subword length result for any given set of operands, said program including first and second parallel-subword program-instruction instances, said first parallel-subword program-instruction instance storing a first subword-length result in a first subword location of a result register, said second parallel-subword program-instruction instance storing a second subword-length result in said result register so that said first and second results are stored concurrently in said result register, said second parallel-subword program-instruction instance storing either said first subword-length result or said second subword length result in a second subword location of said result register.

10. Computer-readable memory as recited in claim 9 wherein said subset includes plural instruction-set instructions program-instruction instances of which store subword-length results in respective different subword locations of the same result register.

11. Computer-readable memory as recited in claim 10 wherein each of said plural program-instruction instances overwrites bit positions within non-selected locations and within its respective subword location.

12. Computer-readable memory as recited in claim 10 wherein each of said plural program-instruction instances leaves intact bit positions within non-respective subword locations of said result register.

13. Computer-readable memory as recited in claim 9 wherein said subset includes a characterizing instruction-set instruction a program-instruction instance of which generates plural replicas of said subword-length result to be stored in plural subword locations of said result register.

14. Computer-readable memory as recited in claim 9 wherein said subset includes an instruction instance that causes said result to be stored in a subword location of said result register that depends on the number of times said instruction instance is iterated.

15. Computer-readable memory as recited in claim 9 wherein at least one pair of said subword locations overlap.

16. Computer-readable memory as recited in claim 9 wherein said subword locations are mutually exclusive.

17. A microprocessor comprising an instruction decoder for decoding and an execution unit for executing program-instruction instances of instruction-set instructions of an instruction set, said instruction set including a subset of parallel subword instruction-subset instructions that collectively provide for a result of an associated characterizing parallel-subword operation to be stored at any selected one of plural result-register subword locations, wherein each program instruction instance of said plural instruction-subset instructions leaves intact bit positions within non-selected locations but not within the selected location.

18. Computer-readable memory encoded with a program of program-instruction instances of instruction-set instructions of an instruction set including a subset of one or more parallel-subword instruction-subset instructions program-instruction instances of which yield the same subword length result for any given operands, a first parallel-subword program-instruction instance of at least one of said instruction subset instructions writing a first subword-length result in a first subword location of a result register, a second parallel-subword program-instruction instance of at least one of said instruction-subset instructions writing a second subword-length result in said result register so that said first and second results are stored concurrently in said result register, said second parallel-subword program-instruction instance writing either said first subword-length result or said second subword length result in a second subword location of said result register.

19. A computer as recited in claim 1 wherein said subset includes a first instruction-subset instruction program-instruction instances of which specify as an argument a subword location for writing said subword-length result.

* * * * *